June 15, 1943.　　W. DALTON　　2,321,999
TERMINAL BOX
Filed Oct. 8, 1941　　3 Sheets-Sheet 1

Inventor:
William Dalton,
by Harry E. Dunlap
His Attorney.

June 15, 1943.                W. DALTON                2,321,999
                              TERMINAL BOX
Filed Oct. 8, 1941                           3 Sheets-Sheet 2
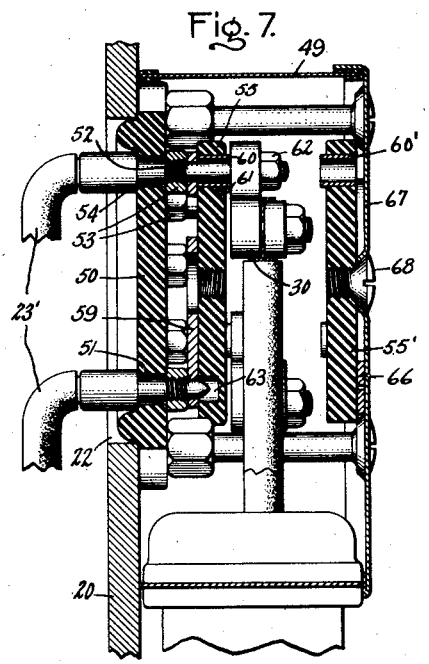
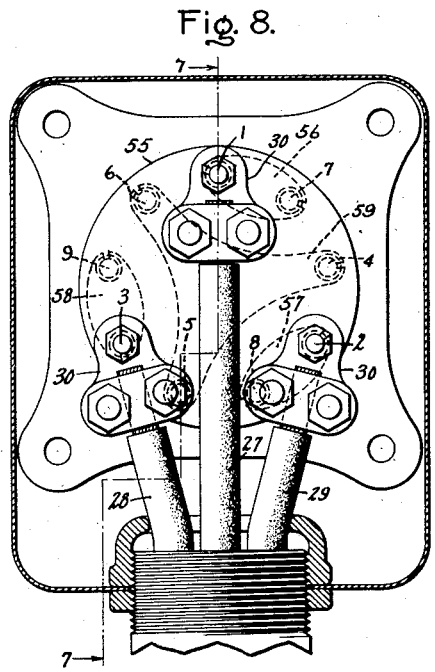
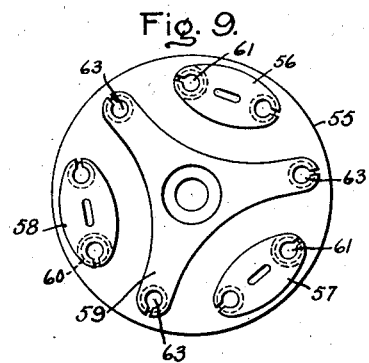
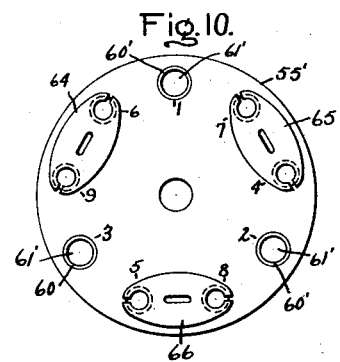
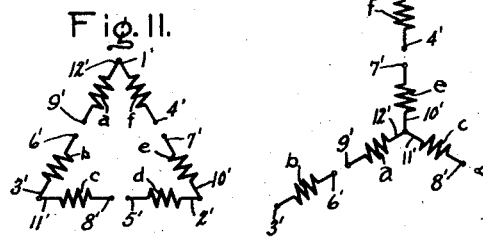
Inventor:
William Dalton,
by Harry E. Dunham
His Attorney.

June 15, 1943.  W. DALTON  2,321,999
TERMINAL BOX
Filed Oct. 8, 1941  3 Sheets-Sheet 3
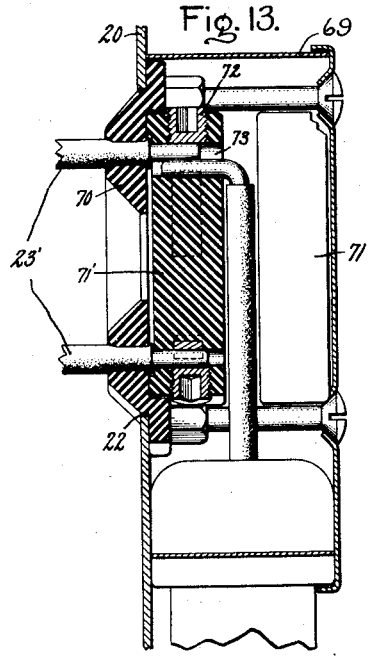
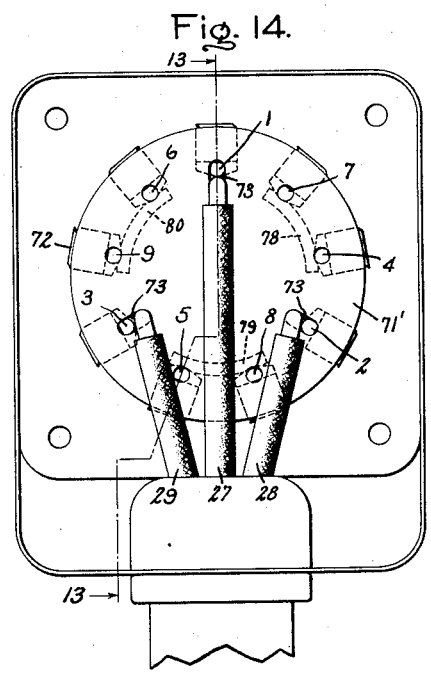
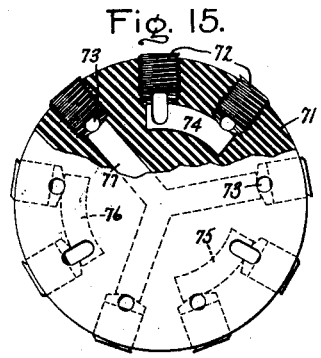
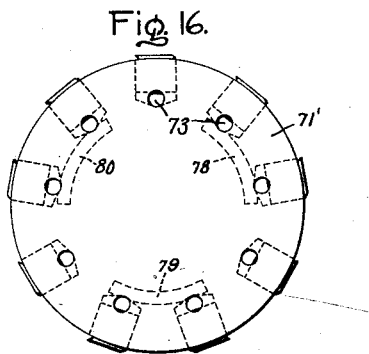
Inventor:
William Dalton,
by Harry E. Dunham
His Attorney.

Patented June 15, 1943

2,321,999

UNITED STATES PATENT OFFICE 2,321,999

TERMINAL BOX

William Dalton, Schenectady, N. Y., assignor to General Electric Company, a corporation of New York Application October 8, 1941, Serial No. 414,125

8 Claims. (Cl. 171—97)

My invention relates to terminal boxes, and although not limited thereto it has application to a terminal box for a dynamo-electric machine.

Dynamo-electric machines, and particularly motors of the multiple-winding plural-phase type usually have a plurality of terminal leads which extend into a terminal box on the outside of the casing of the dynamo-electric machine. In order to connect the leads in desired relation so that the windings will be in series or parallel and in turn to connect these leads to the line conductors, the terminals must be held together by some mechanical means such as nuts and bolts. Certain dynamo-electric machines are adapted to be connected for different voltages, and if the terminals of such a machine are connected for one voltage, it may be desirable to connect them for another voltage. When mechanical arrangements such as nuts and bolts are provided for such connections, the operator must remove the bolts and determine the way the terminals must be connected so that the motor may be run on the new voltage. Such operations not only take time but may result in erroneous connections.

It is, therefore, an object of my invention to provide an improved terminal box which will be simple in construction and economical to manufacture.

Another object of my invention is to provide a terminal box for electrical apparatus which will be simple in construction and provide an arrangement for changing the terminal connections to correspond with the line voltage in a simple, improved, and efficient manner.

Further objects and advantages of my invention will become apparent from the following description referring to the accompanying drawings, and the features of novelty which characterize my invention will be pointed out with particularity in the claims annexed to and forming a part of this specification.

Figure 1:
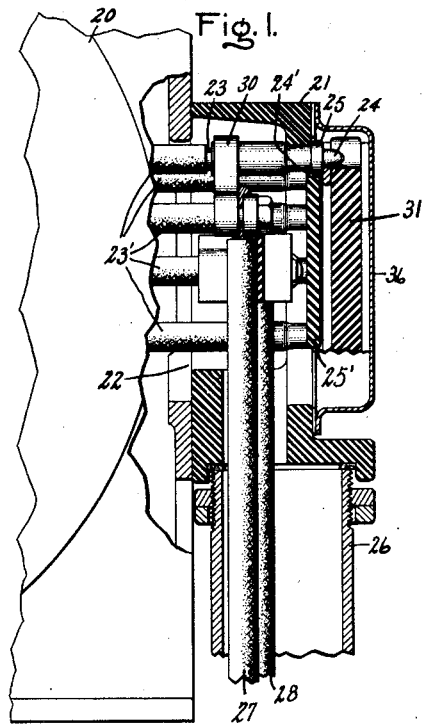
Figure 2:
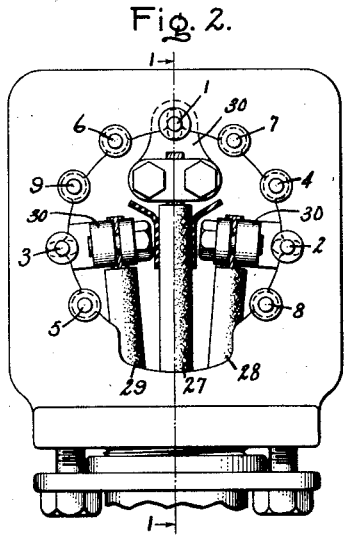
Figure 5:
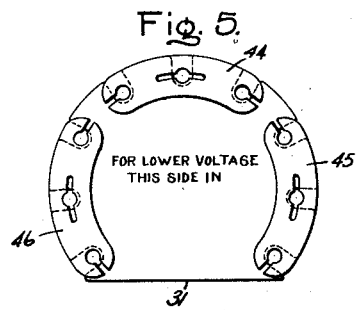
Figure 3:
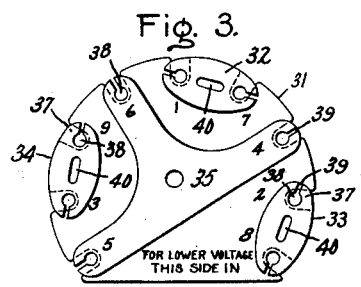
Figure 6:
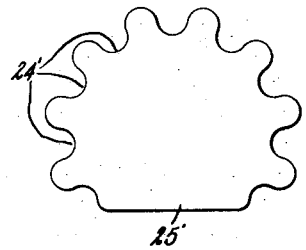
Figure 4:
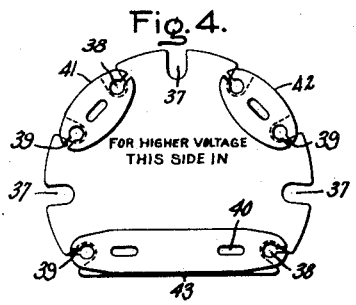

In the drawings, Fig. 1 is a sectional side elevation of a terminal box for a dynamo-electric machine taken along the lines 1—1 of Fig. 2, which is provided with an embodiment of my invention; Fig. 2 is a front view of the terminal box illustrated in Fig. 1, the cover having been removed; Fig. 3 is a front view of an insulating plate with isolated conductor bars carried on a face thereof, which is employed in the terminal box illustrated in Fig. 1 to connect the windings for Y and low voltage; Fig. 4 illustrates the opposite face of the insulating plate of Fig. 3 with isolated conductor bars carried thereon which may be employed when it is desired to connect the windings of a Y or delta connected motor for high voltage operation; Fig. 5 is another connector arrangement of the type illustrated in Figs. 3 and 4 which is employed to connect the motor across low voltage when the windings are connected for delta operation; Fig. 6 is a spacer arrangement employed in the terminal block illustrated in Figs. 1 and 2; Fig. 7 is a sectional side elevation of a modification of the terminal box illustrated in Figs. 1 and 2 taken along the lines 7—7 of Fig. 8; Fig. 8 is a front view of the terminal box illustrated in Fig. 7; Figs. 9 and 10 illustrate insulating plates with isolated conductor segments which are employed in the terminal box illustrated in Figs. 7 and 8; Figs. 11 and 12 diagrammatically illustrate windings connected in delta and Y respectively of an electrical apparatus, such as a motor, to which the terminals in the terminal boxes of my invention may be connected; Fig. 13 is a sectional side elevation of a modification of the terminal boxes illustrated in Figs. 1, 2, 7, and 8 taken along the lines 13—13 of Fig. 14; Fig. 14 is an end view, with the cover removed, of the terminal box illustrated in Fig. 13; and Figs. 15 and 16 illustrate insulating plates with isolated conductor segments which are employed in the terminal box illustrated in Figs. 13 and 14.

In the arrangements illustrated in the drawing, I have provided a terminal box for a dynamo-electric machine, such as a multiple-winding plural-phase motor, which includes a plurality of terminals, each of which has one end connected to the windings of the motor and the other end which projects into the terminal box. The terminal box has an aperture through which the line conductors may pass, and the ends of the line conductors are detachably connected to some of the winding terminals. In order that the windings of the electrical apparatus may be connected in any suitable manner, that is in series or parallel, I provide insulating plates having conductor segments carried thereby for bridging between the proper terminals. These conductor segments are shaped and situated on the insulating plates such that the terminals may be connected together and to the line conductors to provide the desired fixed connections between the parts of the motor winding and between the winding and the line conductors. My improved terminal box is illustrated as adapted for use with a conventional three phase motor having six winding sections or phase groups of coils connected in Y or delta, such that nine terminals 1 to 9, inclusive, are provided for connecting the six winding sections for different voltages. In order to facilitate varying the connections of the motor winding, the winding terminals are arranged in a terminal box in a predetermined spaced-apart relationship as will be explained below and they are adapted to be connected by isolated conductor segments mounted on insulating plates. The insulating plates have other conducting segments on the faces thereof, so that if the different faces be placed in electrically cooperative relation to the terminals, the windings may be connected in different fixed relationships to each other and to the line conductors. Also other insulating plates may be provided with other varieties of shapes of conducting segments thereon so as to be able conveniently to connect the motor windings in any suitable manner, that is, for high or low voltage for Y or delta connections, by merely reversing the insulating plates or by employing another insulating plate with the proper conductor segments thereon.

Referring more particularly to Figs. 1 and 2 of the drawings, I have illustrated a terminal box for a dynamoelectric machine, such as a motor, having an outer casing 20. A terminal box is provided including an outer casing composed of any suitable material such as insulating material 21 which is tightly secured to the outer motor casing 20 and over an aperture 22 therein. Through the aperture extends any suitable number of conductors which have one end thereof connected to the windings inside the motor, and the other end connected to terminal elements. As is illustrated in Fig. 2 the terminals are given numerals from 1 to 9, inclusive, as is done in conventional terminal boxes of motors of this type. It is to be understood, however, that any other suitable number of terminals may be employed depending upon the number of windings the motor has. However, the terminals are arranged in spaced-apart relationship or are distributed in a particular manner around the arc of any suitable curve, such as a circle, the purpose of which will become apparent as the description proceeds. These terminals may be of any suitable shape, and in the arrangement illustrated in Figs. 1 and 2 they include bar shaped members, each having one end 23 thereof connected to winding leads or conductors 23' and another end 24 thereof which projects or extends into the terminal box. Near the end 24 of each of the terminals there is provided a shoulder 25 which cooperates with peripherally indented or cutout portions 24' of a plate 25', which is shown in Fig. 6, in order to hold the ends 24 in spaced-apart relationship in the terminal box. Attached to one end of the terminal box is a conduit 26 through which line conductors 27, 28, and 29 extend. These three line conductors are connected in any suitable manner to suitable winding terminals, such as 1, 2, and 3, connected to the ends of each phase of a three-phase winding, and in the arrangement illustrated in the drawing the ends of the conductors are attached to connectors 30 which are in turn attached to the winding terminals.

As has been stated above, the terminals which are connected to the ends of the phase groups or circuits or belts are arranged in a certain relationship in the terminal box so that the terminals which are adapted to be connected together will be conveniently located close to each other so as to allow the arrangement for connecting the desired terminals together to be made in as simple a construction as possible. Furthermore, the three terminals which are to be connected to line conductors, that is when the terminal box is designed for three phase apparatus, should be conveniently disposed so that the line conductors may be connected to the desired terminals without the connections interfering with each other. In Figs. 11 and 12 are illustrated schematically delta and Y diagrams respectively of a six phase group or winding section three phase motor. The six winding sections are somtimes called phase groups, circuits, or belts and are lettered $a$ to $f$ inclusive. Also, the terminals at the ends of each of the phase groups of the phases are numbered such that the phase group $a$ has numbers $9^1$ and $12^1$ at its ends; the group $b$ has terminals $6^1$ and $3^1$ at its ends; the group $c$ has terminals $11^1$ and $8^1$ at its ends; the group $d$ has terminals $5^1$ and $2^1$ at its ends; the group $e$ has terminals $10^1$ and $7^1$ at its ends; and the group $f$ has terminals $4^1$ and $1^1$ at its ends. This particular method of numbering, as illustrated in Figs. 11 and 12 with the phase groups schematically illustrated for delta and Y connection is the same as that recommended in the publication "Rotation, Connections and Terminal Markings for Electric Power Apparatus" issued by the American Standards Association of the National Electrical Manufacturers Association. Furthermore, the terminal numbers 1 to 9 inclusive employed in the terminal box correspond with the terminals $1^1$ to $9^1$ inclusive employed in numbering the ends of the phase groups illustrated in Figs. 11 and 12. Only 9 terminals are employed in the illustrated embodiment of my invention, since for delta connection $12^1$ is connected to $1^1$, $10^1$ is connected to $2^1$, and $11^1$ is connected to $3^1$ inside the motor, while in the Y connection, $10^1$, $11^1$ and $12^1$ are connected together inside the motor. Thus, in the application of my terminal box illustrated in the drawings, only 9 terminals need be employed. It is to be understood, however, that I may employ any other suitable number of terminals.

Referring again to Figs. 11 and 12, it will be seen that to connect the windings of Fig. 11 for delta high voltage, the windings $a$ and $b$, $c$ and $d$, and $e$ and $f$ are respectively connected in series. In other words, $6^1$ and $9^1$ are connected together, $4^1$ and $7^1$ are connected together, and $8^1$ and $5^1$ are to be connected together. In order to provide the delta connection for low voltage operation, the phase groups $a$ and $b$ are connected in parallel, $c$ and $d$ are connected in parallel, and $e$ and $f$ are connected in parallel, so that the terminals $5^1$, $3^1$ and $9^1$; $6^1$, $1^1$ and $7^1$; and $4^1$, $2^1$ and $8^1$ are respectively connected together. Similarly, the phase groups $a$ to $f$ inclusive may be connected in series or parallel for a Y-connected motor. It is also to be understood that any of the other connections may be obtained with my invention, such as the connections mentioned in the above mentioned A. S. A. publication.

Thus, since the terminals must be connected in the above mentioned manner, I have distributed the terminals 1 to 9 inclusive in a predetermined relationship within the terminal box so that convenient shapes of conductor arrangements may be provided for connecting the terminals together. Thus, as will be seen in the drawing, the terminals are distributed in the following manner: 1, 7, 4, 2, 8, 5, 3, 9, and 6. In other words, the terminals 1 to 9 inclusive for all phase groups of coils $a$ to $f$ inclusive in each phase are arranged in adjacent spaced-apart relationships. Thus, the terminals 1, 7 and 4 for the phase groups $a$ and $b$ of one phase are arranged in a spaced-apart relationship. The terminals 2, 8 and 5 of phase groups c and d are arranged in a predetermined relationship and the terminals of the third phase 3, 9 and 6 are arranged in a predetermined spaced-apart relationship. Furthermore, the corresponding terminals of different phase groups of coils in each phase are arranged in the same respective order. Thus, the terminal 1 of one phase group f is arranged adjacent the terminal 7 which is the corresponding terminal of the second phase group e in that phase, while the other terminal 4 of phase group f is arranged next to the terminal 7. There need be no terminal, however, connected to the other end of the phase group e, since it is solidly connected inside the motor. The terminals of the phase groups of the other two phases are similarly arranged. Also the line conductors are connected to the ends of each of the phases which, in the arrangement described above, will be terminals 1, 2 and 3.

Referring again to Figs. 1 and 2 it will be seen that I have provided an insulating member 31 which is removable from the conduit box and when placed in the position as illustrated in Figs. 1 and 2 cooperates with each of the extending ends of the terminals 1 to 9, inclusive. Fig. 3 illustrates one face of the insulating plate 31 which is provided with a plurality of isolated or electrically insulated conducting segments. The segments are so situated that a conducting segment 32 will connect terminals 1 and 7 together, conducting segment 33 will connect terminals 2 and 8 together, conducting segment 34 will connect together terminals 3 and 9, and conducting segment 35 will connect together terminals 4, 5, and 6. Referring to Fig. 12, it will be seen that this connects the Y connected windings for low voltage. By distributing the nine terminals around the box in the manner already described it will be seen that the majority of the terminals which are to be connected together are adjacent each other, this minimizing the size necessary for the conducting segments. Upon removing the cover 36, the insulating plate 31 may be inserted in the terminal box with the face thereof carrying these conducting segments, overlying the ends 24 of the terminals. It will, therefore, be seen that the terminals 1 and 7, 2 and 8, and 3 and 9 will be respectively connected together while the terminals 4, 5, and 6 will be connected together. The connection between the conducting segments 32, 33, 34 and 35, and the cooperating ends of the terminals may be made in any suitable manner, and in the arrangement illustrated in the drawings, the insulating plate 31 is provided with a plurality of peripheral indentations or cutout portions 37 on portions thereof which overlie the ends 24 of the terminals. The conducting segments are also provided with apertures 38 which are slit at 39 so that when the plate 31 is pressed against the ends of the terminals, the ends 24 of each of the terminals will project through the apertures 38 of the cooperating conducting segments and into the portions 37. The holes 38 are made of a suitable size so that the terminal ends 24 will force a sufficient expansion of the bore of the aperture 38 to provide an efficient electrical connection therebetween when the segments are forced into engagement with the shoulders 25. The conducting segments may be held or carried by the plate 31 in any suitable manner such as by providing extending portions 40 from the face of the plate which extend into cooperating slots in the plate. The keys or tabs are enlarged at their ends to hold the segments securely in place. This may be accomplished by molding the plate with the segments as inserts.

Fig. 4 illustrates the face of the insulating plate 31 opposite to that illustrated in Fig. 3 and it will be seen that conducting segments 41, 42, and 43 are provided with suitable snaps so that the terminals 7 and 4, 8 and 5, and 9 and 6 may be respectively connected together in series when the face of the plate 31 illustrated in Fig. 4 is placed in cooperative relation with the winding terminals. This connection will put Y connected windings in high voltge connection.

In order to connect delta connected winding sections of a motor for low voltage the phase groups a and b, c and d, e and f are respectively connected in parallel. This may readily be done by a plate 31' as illustrated in Fig. 5 with isolated electrically conducting segments 44, 45, and 46 carried by a face thereof so that the terminals 6, 1, and 7; 4, 2, and 8; and 5, 3, and 9 may be respectively electrically connected in series together, when the face thereof as illustrated in Fig. 5 is placed in cooperative relation with the ends 24 of the winding terminals. In order to connect the winding terminals of a delta connected motor for high voltage, it is only necessary to provide the face of the insulating plate 31' opposite to that illustrated in Fig. 5 with conducting segments similar to those illustrated in Fig. 4. Thus, the phase groups a and b are connected in series by connecting terminals 6 and 9. Similarly 8 and 5 connect c and d in series and 4 and 7 connect e and f in series. These insulating plates may be made of any suitable shape with respect to the shape of the inside of the box so that the plates can be inserted therein in only one manner or predetermined position in order to insure a predetermined proper fixed electrical connection when in the predetermined position, or the insulating plates 31 and 31' may have suitable instructions and numerals on the faces thereof to guide the operator.

In Figs. 7 and 8 I have illustrated a modification of the terminal box shown in Figs. 1 and 2 which includes a box portion 49 composed of any suitable material which is secured to the motor casing 20 over the aperture 22. In order to hold the terminals 1 to 9, inclusive, in spaced relationship, I provide an insulating member 50 with a plurality of apertures 51 through which the nine terminals which are connected to the phase groups as illustrated in Figs. 11 and 12, may project. The terminals in this modification may be threaded as at 52 and nuts 53 screwed on to the threads so that the terminals may be tightly held by the insulating board 50 between the nuts 53 and shoulders 54 formed on the terminal elements. The line conductors 27, 28, 29 are respectively connected to the terminals 1, 2, and 3 for the reasons given above in connection with Figs. 1 to 6 by means of connectors 30 similar to those employed in the terminal box illustrated in Figs. 1 and 2. An insulating plate 55 is provided with conducting segments of a suitable type and shape in order to obtain the desired electrical connection between the terminals, as has been described above in connection with the terminal box illustrated in Figs. 1 and 2. In Fig. 9 I have illustrated the insulating plate 55 with conducting segments 56 to 59, inclusive, so that the terminals will be connected in Y and for low voltage. In order to provide electrical connection between the terminals 1, 2, and 3 and certain of the conducting segments, the conducting segments 56, 57, and 58 are provided with sleeves or tubular members 60 in apertures 61 arranged in registry with the terminals 1, 2 and 3. The terminals 1, 2, and 3 are longer than the remaining terminals so that they may project through the apertures 61 and are threaded at the ends thereof so that nuts 62 may tightly secure the respective connectors 30 against the end of the tubes 60 which project a small amount from the face of the plate 55, as will be seen in Fig. 6. Also the insulating plate 55 has a plurality of recesses or indentations 63 into which the ends of the remaining terminals extend when they cooperate with their respective conducting segments. Since connections are made from both sides of the insulating plate 55 in the modification of my invention illustrated in Figs. 7 and 8, conducting segments are provided on only one side of the insulating plate 55, and in order to connect a Y connected motor winding for high voltage, an insulating plate 55', as illustrated in Fig. 10, may be provided with suitably placed conducting segments 64, 65 and 66, and apertures 61' through which the terminal ends 1, 2, and 3 may extend. Tubes 60' may also be provided, if desired, through which the terminals 1, 2, and 3 may snugly fit to improve the electrical connection between these terminals and the line conductors. It will be noted that with the plate 55' no electrical connection is made between the terminals 1, 2, and 3 and any of the others as is done with the plate 55. Since to connect the phase groups of Fig. 12 in parallel 4 and 7, 8 and 5, and 6 and 9 are respectively connected together. It is apparent that the other insulating plates may be provided for connecting a motor for delta high and low voltage. Thus, as shown in Fig. 7 the insulating plate 55 with the conducting segments, which is not in use may be held on the inside surface of a removable terminal box cover 67 by a screw 68. Therefore, assuming that the plate 55 is connected to the terminals, the plate 55' may be conveniently held by the cover so that it is available when it is desired to connect the motor for high voltage operation. Here again the plates may have such shapes or instructions may be inserted thereon to insure correct insertion of the plates to provide predetermined fixed connections.

Figs. 13 and 14 illustrate a modification of the terminal box which includes a terminal box 69 held on the outside of the casing 20 over the aperture 22 and an insulating member 70 is provided with a suitable number of apertures through which the winding conductors 23' may extend which are connected to the windings a to f, inclusive. The conductors provide terminal elements 1 to 9, inclusive, which extend into the terminal box 69 and which are connected to the coil groups a to f, inclusive, as has already been described. Insulating plates 71 and 71' are provided so that the desired connections may be made between the various parts of the winding and the line conductors 27, 28 and 29, as is done in the terminal boxes which have already been described. In order to provide an arrangement for detachably connecting certain terminals together I have provided a plurality of studs 72 which extend radially into the plate 71 into cooperating threaded surfaces. A suitable distance inside the insulating plate I have also provided a plurality of apertures 73 which extend axially through the insulating plate. These apertures 73 are so disposed that when the insulating plate 71 is placed in a terminal box as illustrated in Fig. 13 the terminals 1 to 9 will project into the apertures 71. Suitable conducting segments are also provided in the interior of the insulating plate for properly connecting the terminals with each other when the respective conducting studs 72 are tightly secured against their cooperating terminals. Thus, the insulating plate shown in Fig. 15, which is designed for a Y and low voltage connection, has conducting segments 74, 75, 76, and 77 as is done in the insulating plate illustrated in Figs. 3 and 9. In order to be able to accommodate the terminals 1, 2 and 3 as well as the cooperating ends of the lines 27, 28 and 29, the apertures 73 which are in registry with the terminals 1, 2 and 3 are larger than the remaining apertures, as is shown in Figs. 13 and 14. The ends of the line conductors 27, 28 and 29 are bent at right angles with the conductor so as to project into the axially extending aperture 73 adjacent to terminals 1, 2, and 3. When the respective studs 72 are screwed into the insulating plate the terminal 1 and the end of the conductor 27 and the cooperating end of the conducting plate 74 will be tightly secured together. The remaining segments and terminals are tightly secured together in like manner. With this modification the segments and terminals may be secured tightly together by screwing the studs 72 inwardly with any suitable tool extending radially into hexagonal pockets in the heads of the studs 72. It will be seen in Fig. 16 that I have illustrated an insulating plate 71' having conducting segments 78, 79, and 80 in the inside thereof for connecting the motor in Y for high voltage, and if the insulating plate 71' be employed inside the box, the plate 71 may be held at the inside of the cover 76 between the cover 76 and the line conductors 27, 28, and 29. Insulating plates may be provided of the type shown in Figs. 15 and 16 for connecting a delta connected motor for high or low voltage by providing connecting elements for connecting the proper terminals as in the other embodiments of my invention.

In view of the foregoing, it will be seen that I have provided terminal box constructions which may be employed for conveniently connecting together the windings of any suitable electrical apparatus for different voltages and connections. The invention has been described as applied to terminal boxes for a dynamo-electric machine, however, it is to be understood that it may be employed with any suitable electrical apparatus which has windings or elements which may be selectively connected together to provide different characteristics or so that a different source of power may be connected with the elements or windings.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. A terminal box for a dynamo-electric machine including a plurality of machine winding terminals having portions extending into said box, said box having means for accommodating line conductors, means for detachably connecting the line conductors to some of said terminals, a removable insulating means adapted to be placed in said box in a predetermined position, and a plurality of conducting means carried by said insulating means for connecting the windings together and to the line conductors in a fixed predetermined relationship when said insulating means is in said predetermined position.

2. A terminal box for a dynamo-electric machine including a plurality of machine winding terminals having ends extending into said box, said box having means for accommodating line conductors, means for detachably connecting the line conductors to some of said terminals, a removable insulating plate adapted to be placed in said box in a predetermined position, and a plurality of conducting segments carried by said plate for connecting the winding terminals together in a fixed predetermined relationship when said insulating plate is in said predetermined position.

3. A terminal box for a dynamo-electric machine including a plurality of machine winding terminals having ends extending into said box, said box having means for accommodating line conductors, means for detachably connecting the line conductors to some of said terminals, a removable insulating plate adapted to be placed in said box in a predetermined position, and a plurality of insulated conducting bars carried on one face of said plate for connecting the winding terminals together and to the line conductors in a fixed predetermined relationship when said insulating plate is in said predetermined position.

4. A terminal box for a dynamo-electric machine including a plurality of machine winding terminals having ends extending into said box, said box having means for accommodating line conductors, means for detachably connecting the conductors to some of said terminals, a removable insulating plate adapted to be placed in said box with either face in cooperative relationship with said extending ends of said terminals, and a plurality of conducting segments carried by both sides of said plate, said conducting segments on one face of said plate being arranged for connecting together said terminals in one predetermined relationship and said conducting segments on the other face being arranged for connecting together said terminals in another predetermined relationship.

5. A terminal box for a dynamo-electric machine including a plurality of machine winding terminals having ends extending into said box, said box having means for accommodating line conductors, means for detachably connecting the line conductors to some of said terminals, a plurality of removable insulating plates each being adapted to be separately placed in said box in cooperative relationship with said extending ends of said terminals, a plurality of conducting segments carried by each of said plates, said conducting segments of one of said plates being arranged for connecting together said terminals in one predetermined relationship and said conducting segments of another of said plates being arranged for connecting together said terminals in another predetermined relationship, and means for supporting within said box one of said plates when not in use.

6. A terminal box for an electrical apparatus including a plurality of apparatus winding terminals having ends extending into said box, said box having means for accommodating line conductors, means for detachably connecting the line conductors to some of said terminals, a plurality of removable insulating plates each being adapted to be separately placed in said box in cooperative relationship with said extending ends of said terminals, a plurality of conducting segments carried by each of said plates, said conducting segments of one of said plates being arranged for connecting together said terminals in one predetermined relationship and said conducting segments of another of said plates being arranged for connecting together said terminals in another predetermined relationship, a cover for said box, and means for supporting within said box one of said plates when not in use.

7. A terminal box for an electrical apparatus including a plurality of apparatus winding terminals having ends extending into said box, said box having means for accommodating line conductors, means for detachably connecting the line conductors to some of said terminals, a removable insulating means adapted to be placed in said box and in cooperative relationship with said extending ends, and a plurality of conducting means within said insulating means, said insulating means having apertures adjacent said conducting means for accommodating said ends of said terminals for connecting the winding terminals together and to the line conductors in a predetermined relationship.

8. A terminal box for an electrical apparatus having a plurality of phase groups of coils forming a three phase winding including a plurality of apparatus winding terminals having ends extending into said box providing a plurality of terminals, means for arranging in adjacent spaced-apart relationship terminals of all phase groups of coils in each phase with corresponding terminals of different phase groups of coils in each phase arranged in the same respective order, means within said box for electrically connecting together said terminals in a predetermined relationship, said box having means for accommodating line conductors, and means for connecting a different line conductor to at least one terminal of a phase group of coils of each phase.

WILLIAM DALTON.